(12) United States Patent
Franklin

(10) Patent No.: US 10,967,775 B2
(45) Date of Patent: Apr. 6, 2021

(54) INFLATABLE SEAT CUSHION APPARATUS

(71) Applicant: Michael Franklin, Baytown, TX (US)

(72) Inventor: Michael Franklin, Baytown, TX (US)

( * ) Notice: Subject to any disclaimer, the term of this patent is extended or adjusted under 35 U.S.C. 154(b) by 62 days.

(21) Appl. No.: 16/542,046

(22) Filed: Aug. 15, 2019

(65) Prior Publication Data

US 2021/0046856 A1 Feb. 18, 2021

(51) Int. Cl.
*B60N 2/90* (2018.01)
*A47C 4/54* (2006.01)
*B60N 2/02* (2006.01)

(52) U.S. Cl.
CPC ............... *B60N 2/914* (2018.02); *A47C 4/54* (2013.01); *B60N 2/0224* (2013.01)

(58) Field of Classification Search
None
See application file for complete search history.

(56) References Cited

U.S. PATENT DOCUMENTS

| | | | |
|---|---|---|---|
| 3,330,598 A | 7/1967 | Whiteside | |
| 4,501,034 A * | 2/1985 | Greenawalt | A47G 9/10 5/636 |
| 4,589,695 A * | 5/1986 | Isono | A47C 7/467 297/284.9 |
| 4,707,027 A * | 11/1987 | Horvath | B60N 2/914 297/284.6 |
| 4,840,425 A | 6/1989 | Noble | |
| 5,529,377 A * | 6/1996 | Miller | A47C 4/54 297/284.6 |
| 5,898,963 A * | 5/1999 | Larson | A47G 9/1027 5/640 |
| 5,927,427 A | 7/1999 | Sewell | |
| 6,058,341 A | 5/2000 | Myers | |
| 6,070,942 A | 6/2000 | Barton | |
| 6,327,725 B1 * | 12/2001 | Veilleux | A47G 9/0253 5/644 |
| 6,990,700 B2 * | 1/2006 | Chung | A47C 27/082 5/713 |
| 7,424,760 B2 * | 9/2008 | Chaffee | A47C 4/54 5/644 |
| 7,578,015 B1 * | 8/2009 | Wilson | A47G 9/1036 5/636 |
| 8,720,473 B2 * | 5/2014 | Almeida | F15D 1/025 137/223 |
| 8,944,504 B2 | 2/2015 | Zimmerman, II | |
| 9,731,638 B2 * | 8/2017 | Benson | B60N 2/505 |
| 9,840,171 B2 | 12/2017 | Arant | |

(Continued)

*Primary Examiner* — David E Allred

(57) ABSTRACT

An inflatable seat cushion apparatus for comfort and pain prevention includes a cushion bladder having a bladder front side, a bladder back side, a bladder top side, a bladder bottom side, a bladder left side, and a bladder right side defining a bladder inside. A pump is coupled to the cushion bladder. The pump is coupled to the bladder left side within the bladder inside and has an intake vent and a power switch extending through the bladder left side. The power switch activates the pump to inflate the bladder inside. A release valve is coupled to the cushion bladder and extends through the bladder left side to selectively deflate the bladder inside. A pair of foam wings is coupled to the cushion bladder. The pair of foam wings is coupled to the bladder top side adjacent the bladder left side and the bladder right side.

6 Claims, 4 Drawing Sheets

(56) References Cited

U.S. PATENT DOCUMENTS

| | | |
|---|---|---|
| 9,981,588 B2 | 5/2018 | Dry |
| 10,046,671 B2 * | 8/2018 | Seiller ................. B60N 2/0248 |
| 10,065,534 B1 | 9/2018 | Line |
| 2004/0222684 A1 * | 11/2004 | VanSickle ............ A47C 27/081 |
| | | 297/452.41 |
| 2016/0207429 A1 | 7/2016 | Fitzpatrick |
| 2019/0387897 A1 * | 12/2019 | Jiang .................... F04D 25/084 |

* cited by examiner

INFLATABLE SEAT CUSHION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seat cushion devices and more particularly pertains to a new seat cushion device for comfort and pain prevention.

(2) Description of Related Art Including Information Disclosed Under 37 CFR 1.97 and 1.98

The prior art relates to seat cushion devices.

BRIEF SUMMARY OF THE INVENTION

An embodiment of the disclosure meets the needs presented above by generally comprising a cushion bladder having a bladder front side, a bladder back side, a bladder top side, a bladder bottom side, a bladder left side, and a bladder right side defining a bladder inside. A pump is coupled to the cushion bladder. The pump is coupled to the bladder left side within the bladder inside and has an intake vent and a power switch extending through the bladder left side. The power switch activates the pump to inflate the bladder inside. A release valve is coupled to the cushion bladder and extends through the bladder left side to selectively deflate the bladder inside. A pair of foam wings is coupled to the cushion bladder. The pair of foam wings is coupled to the bladder top side adjacent the bladder left side and the bladder right side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
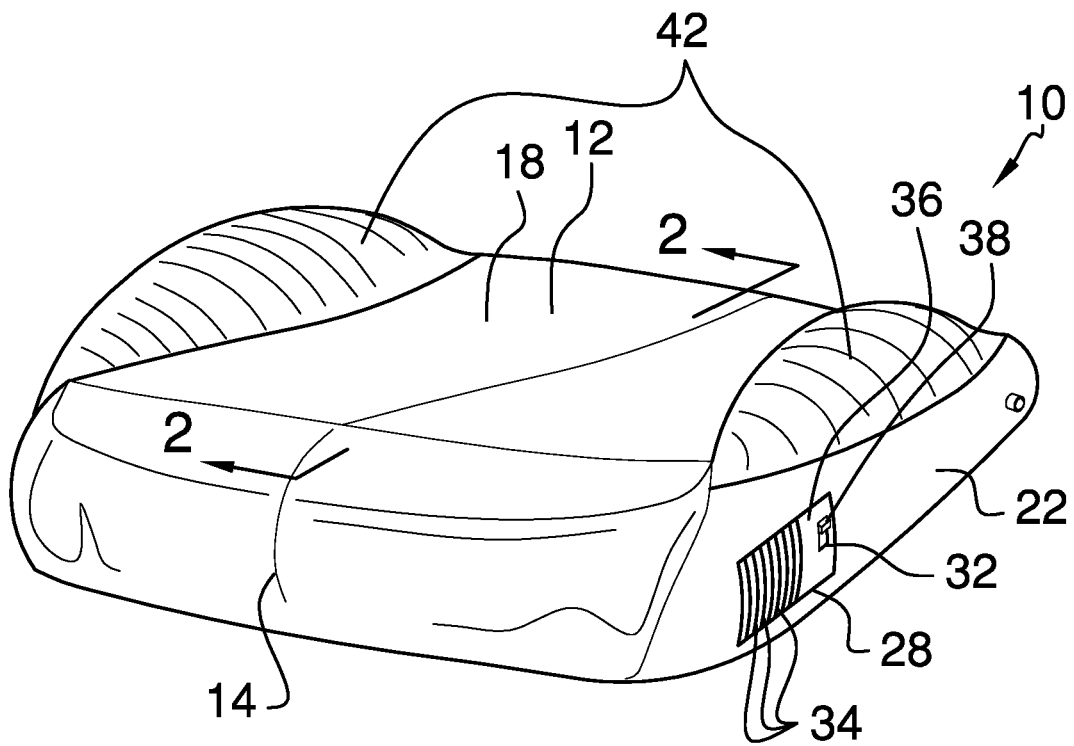
FIG. 1 is an isometric view of an inflatable seat cushion apparatus according to an embodiment of the disclosure.
Figure 2:
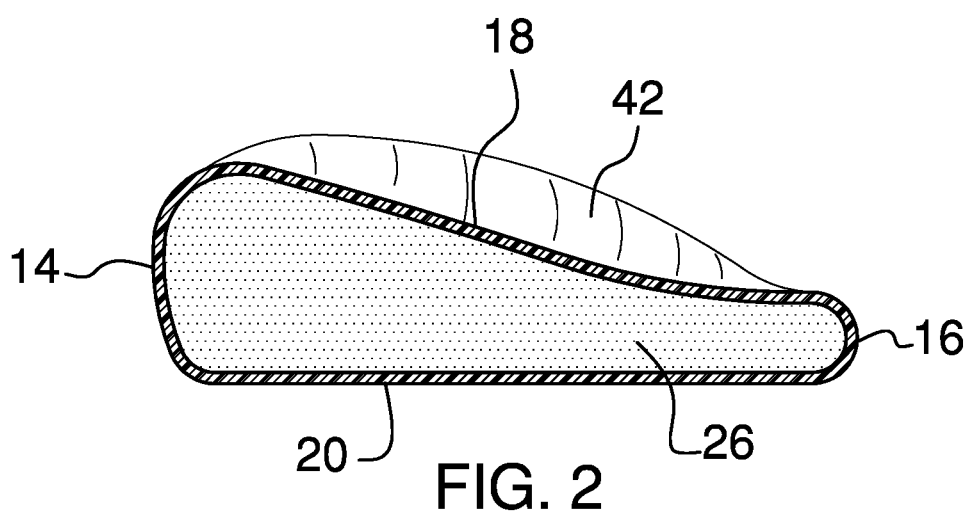
FIG. 2 is a cross-sectional view of an embodiment of the disclosure along line 2-2 of FIG. 1.
Figure 3:
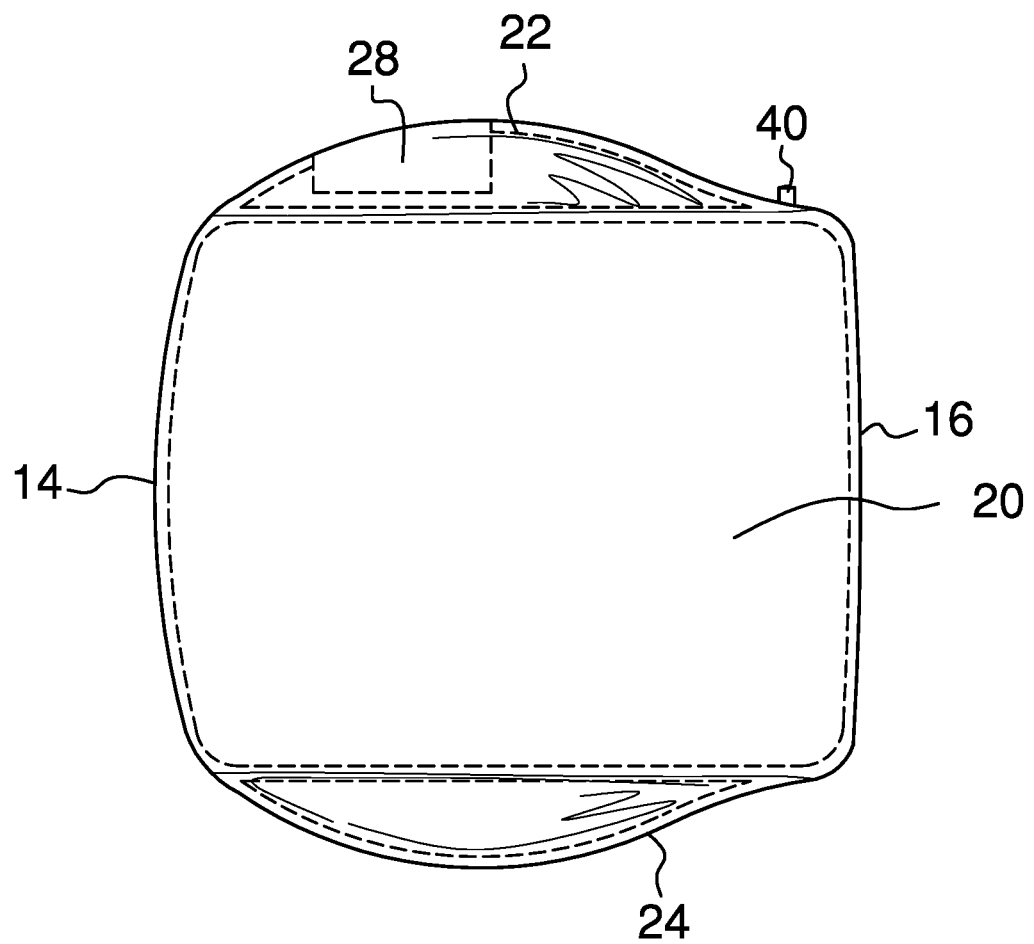
FIG. 3 is a bottom plan view of an embodiment of the disclosure.
Figure 4:
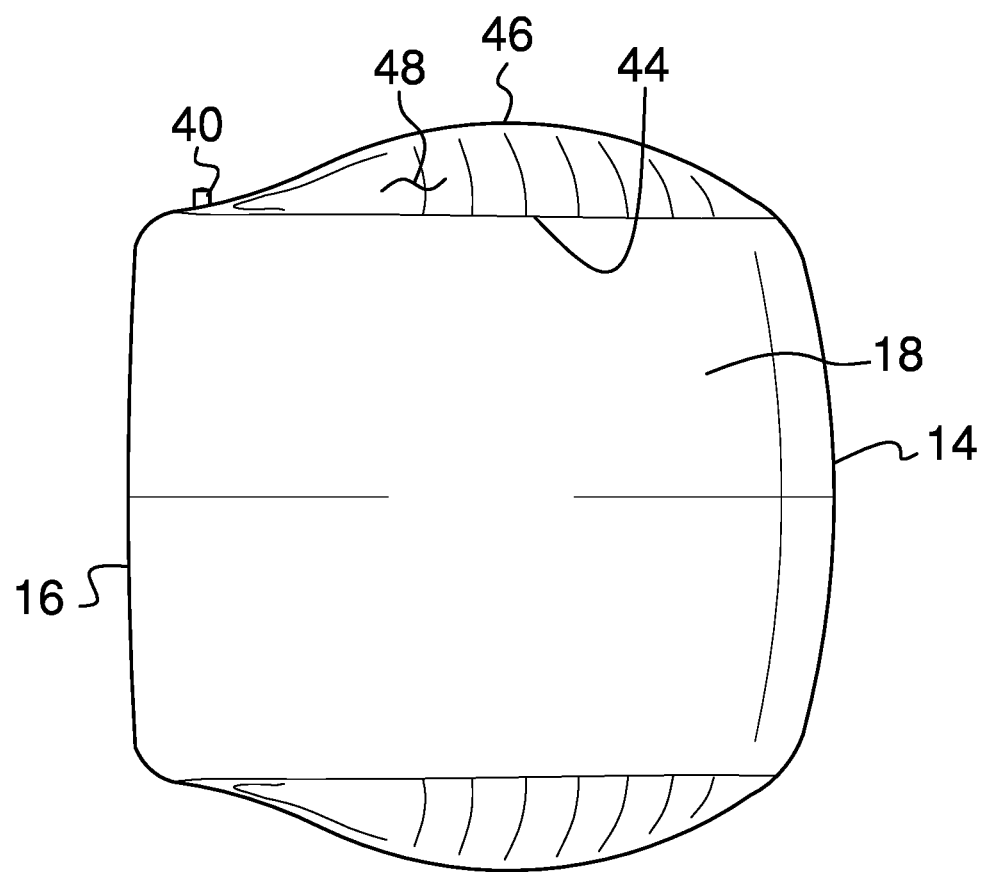
FIG. 4 is a top plan view of an embodiment of the disclosure.
Figure 5:
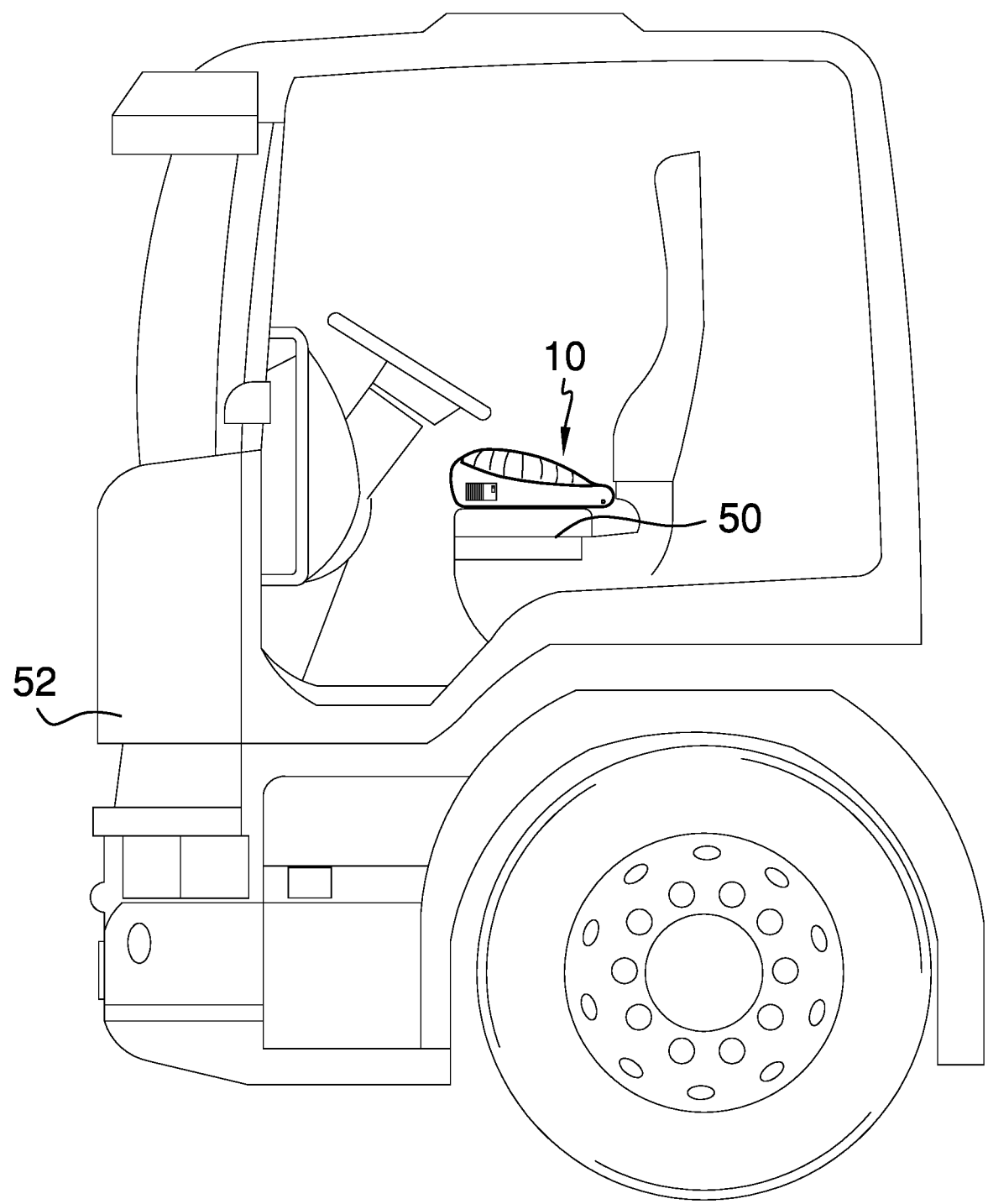
FIG. 5 is an in-use view of an embodiment of the disclosure.

With reference now to the drawings, and in particular to FIGS. 1 through 5 thereof, a new seat cushion device embodying the principles and concepts of an embodiment of the disclosure and generally designated by the reference numeral 10 will be described.

As best illustrated in FIGS. 1 through 5, the inflatable seat cushion apparatus 10 generally comprises a cushion bladder 12 having a bladder front side 14, a bladder back side 16, a bladder top side 18, a bladder bottom side 20, a bladder left side 22, and a bladder right side 24 defining a bladder inside 26. A height of the bladder front side 14 is greater than a height of the bladder back side 16. The bladder top side 18 rounds from the bladder front side 14 and slopes down to the bladder back side 16. The bladder back side 16 may be rounded.

A pump 28 is coupled to the cushion bladder 12. The pump 28 is coupled to the bladder left side 22 within the bladder inside 26 and has an intake vent 30 and a power switch 32 extending through the bladder left side 22 to prevent interference while a driver is manipulating a gear shifter to his right. The intake vent 30 has a plurality of vertical grate bars 34 to keep fingers and debris from entering the pump 28. The power switch 32 may have a rectangular switch plate 36 and a slider switch 38 coupled within the switch plate 36. The power switch 32 activates the pump 28 to inflate the bladder inside 26. A release valve 40 is coupled to the cushion bladder 12. The release valve 40 extends through the bladder left side 22 to selectively deflate the bladder inside 26.

A pair of foam wings 42 is coupled to the cushion bladder 12 for increased comfort and support of the driver's legs. The pair of foam wings 42 is coupled to the bladder top side 18 adjacent the bladder left side 22 and the bladder right side 24. Each of the foam wings 42 has a straight inner edge 44, a curved outer edge 46, and a rounded wing top side 48. The outer edge 46 flares out from proximal the bladder front side 14 and tapers back towards the bladder back side 16.

In use, the apparatus 10 is paced on a seat 50 of a truck 52 and the pump 28 is used to inflate the bladder inside 26. The release valve 40 may then be used to achieve a desired level of firmness. The driver sits on the apparatus to increase comfort and prevent health problems such as hemorrhoids and lower back pain.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An inflatable seat cushion apparatus comprising:
   a cushion bladder, the cushion bladder having a bladder front side, a bladder back side, a bladder top side, a bladder bottom side, a bladder left side, and a bladder right side defining a bladder inside, wherein the cushion bladder is a single bladder that spans from a right to a left side of the cushion apparatus;
   a pump coupled to the cushion bladder, the pump being coupled to the bladder left side within the bladder inside, the pump having an intake vent and a power switch extending through the bladder left side, the power switch activating the pump to inflate the bladder inside;
   a release valve coupled to the cushion bladder, the release valve extending through the bladder left side to selectively deflate the bladder inside; and
   first and second foam wings coupled to the cushion bladder, the first and second foam wings being respectively coupled to the bladder top side adjacent the bladder left side and the bladder right side, wherein the cushion apparatus is devoid of foam between the first and second foam wings.

2. The inflatable seat cushion apparatus of claim 1 further comprising a height of the bladder front side being greater than a height of the bladder back side, the bladder top side rounding from the bladder front side and sloping down to the bladder back side.

3. The inflatable seat cushion apparatus of claim 1 further comprising the bladder back side being rounded.

4. The inflatable seat cushion apparatus of claim 1 further comprising each of the foam wings having a straight inner edge, a curved outer edge, and a rounded wing top side, the outer edge flaring out from proximal the bladder front side and tapering back towards the bladder back side.

5. The inflatable seat cushion apparatus of claim 1 further comprising the intake vent having a plurality of vertical grate bars, the power switch having a rectangular switch plate and a slider switch coupled within the switch plate.

6. An inflatable seat cushion apparatus comprising:
   a cushion bladder, the cushion bladder having a bladder front side, a bladder back side, a bladder top side, a bladder bottom side, a bladder left side, and a bladder right side defining a bladder inside, a height of the bladder front side being greater than a height of the bladder back side, the bladder top side rounding from the bladder front side and sloping down to the bladder back side, the bladder back side being rounded, wherein the cushion bladder is a single bladder that spans from a right to a left side of the cushion apparatus;
   a pump coupled to the cushion bladder, the pump being coupled to the bladder left side within the bladder inside, the pump having an intake vent and a power switch extending through the bladder left side, the intake vent having a plurality of vertical grate bars, the power switch having a rectangular switch plate and a slider switch coupled within the switch plate, the power switch activating the pump to inflate the bladder inside;
   a release valve coupled to the cushion bladder, the release valve extending through the bladder left side to selectively deflate the bladder inside; and
   a pair of foam wings coupled to the cushion bladder, the pair of foam wings being coupled to the bladder top side adjacent the bladder left side and the bladder right side, respectively, each of the foam wings having a straight inner edge spaced from the other of the foam wings, a curved outer edge, and a rounded wing top side, the outer edge flaring out from proximal the bladder front side and tapering back towards the bladder back side, wherein the cushion apparatus is devoid of foam between the first and second foam wings.

* * * * *